United States Patent
Takato

(10) Patent No.: US 7,612,683 B2
(45) Date of Patent: Nov. 3, 2009

(54) INDICATION CHANGE INSTRUMENT CLUSTER

(75) Inventor: Kenichi Takato, Rochester Hills, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 276 days.

(21) Appl. No.: 11/583,530

(22) Filed: Oct. 19, 2006

(65) Prior Publication Data

US 2007/0090932 A1 Apr. 26, 2007

Related U.S. Application Data

(60) Provisional application No. 60/729,023, filed on Oct. 21, 2005.

(51) Int. Cl.
*G08B 21/00* (2006.01)

(52) U.S. Cl. .................. 340/687; 340/450; 340/688; 340/815.55; 340/815.56; 116/62.1; 116/62.3; 116/47; 116/48

(58) Field of Classification Search ............... 340/687, 340/438, 450, 461, 464, 688, 815.54–815.58, 340/815.78, 425.5; 362/23, 26–30, 294, 362/487–489, 511, 459–464, 482, 601, 602, 362/605; 116/62.1, 284, 335, 47, 48, 62.3, 116/334; 40/205; 349/56; 345/102, 30, 345/84

See application file for complete search history.

(56) References Cited

U.S. PATENT DOCUMENTS

| 4,777,480 A | | 10/1988 | Okamoto et al. |
| 4,875,433 A | * | 10/1989 | Tsukamoto ............... 116/335 |
| 6,407,663 B1 | * | 6/2002 | Huggett ................... 340/461 |
| 2005/0109261 A1 | | 5/2005 | Tanaka et al. |

FOREIGN PATENT DOCUMENTS

| DE | 3119215 | 12/1982 |
| DE | 19816823 | 10/1998 |
| FR | 2729345 | 7/1996 |
| FR | 2760834 | 9/1998 |

OTHER PUBLICATIONS

International Search Report and Written Opinion Dated Mar. 29, 2007.
International Search Report Dated Mar. 2, 2007.
U.S. Patent Application: "Indication Change Instrument Cluster", U.S. Appl. No. 11/583,528, filed Oct. 19, 2006.
International Search Report and Written Opinion dated Feb. 22, 2007.

* cited by examiner

*Primary Examiner*—Benjamin C Lee
*Assistant Examiner*—Sisay Yacob

(57) ABSTRACT

An illuminated gauge includes a dial with at least first and second ranges of markings. The first range of markings indicates one type of vehicle information and the second range of markings indicates another type of vehicle information. A single motor is used to move a common pointer between the first and second ranges of markings. A selector is to be operated by a user to select between the different types of vehicle information.

15 Claims, 12 Drawing Sheets

US 7,612,683 B2

INDICATION CHANGE INSTRUMENT CLUSTER

CROSS REFERENCE TO RELATED APPLICATION

The application claims priority to U.S. Provisional Application No. 60/729,023 which was filed on Oct. 21, 2005.

BACKGROUND OF THE INVENTION

This invention generally relates to illuminated gauge dials. More particularly, this invention relates to a gauge dial that can display at least two different types of vehicle information with a common pointer.

Vehicles include instrument panels with illuminated gauges and pointers to indicate vehicle information such as speed, fuel economy, oil pressure, voltage, etc. An illuminated gauge is comprised of a dial with associated vehicle information, a light source and light housing, and a pointer that is driven by a motor for movement relative to the dial. The dial includes markings with a specified range of information, and the motor positions the pointer to indicate the appropriate marking within the range of information.

In a typical arrangement, each gauge includes one type of vehicle information. For example, a tachometer will display a range of revolutions per minute (rpm) for an engine; a speedometer will display a vehicle speed range of miles per hour (mph), and a fuel economy gauge will displace a miles per gallon (mpg) range for fuel consumption. Each gauge requires its own dial, motor, and pointer to specify the appropriate information. This can be expensive for vehicles with a significant number of gauges. Further, this traditional configuration requires a significant amount of packaging space within a dashboard to mount the instrument cluster.

Accordingly, it is desirable provide a gauge configuration that is more cost effective and compact, but which is capable of displaying the same amount of information as traditional instrument clusters.

SUMMARY OF THE INVENTION

An illuminated gauge includes a dial with at least first and second ranges of markings. The first range of markings indicates one type of vehicle information and the second range of markings indicates another type of vehicle information. One power source is used to move a common pointer to operate in either the first or second ranges of markings.

In one example, a selector such as a button or switch for example, is operated by a user to select between the different types of vehicle information. The selector can be located at any easily accessible portion of the vehicle such as a dashboard, center counsel, or steering wheel for example.

A light source illuminates the pointer, which moves relative to one of the first and second ranges of markings to identify the corresponding vehicle information. In one configuration, the illuminated gauge includes a first light source that only illuminates the pointer when operating within the first range of markings and a second light source that only illuminates the pointer when operating within the second range of markings.

Using a single pointer and power source for identifying different types of vehicle information provides a more compact and cost effective instrument cluster configuration. These and other features of the present invention can be best understood from the following specification and drawings, the following of which is a brief description.

DETAILED DESCRIPTION OF THE PREFERRED EMBODIMENT

Figure 1A:
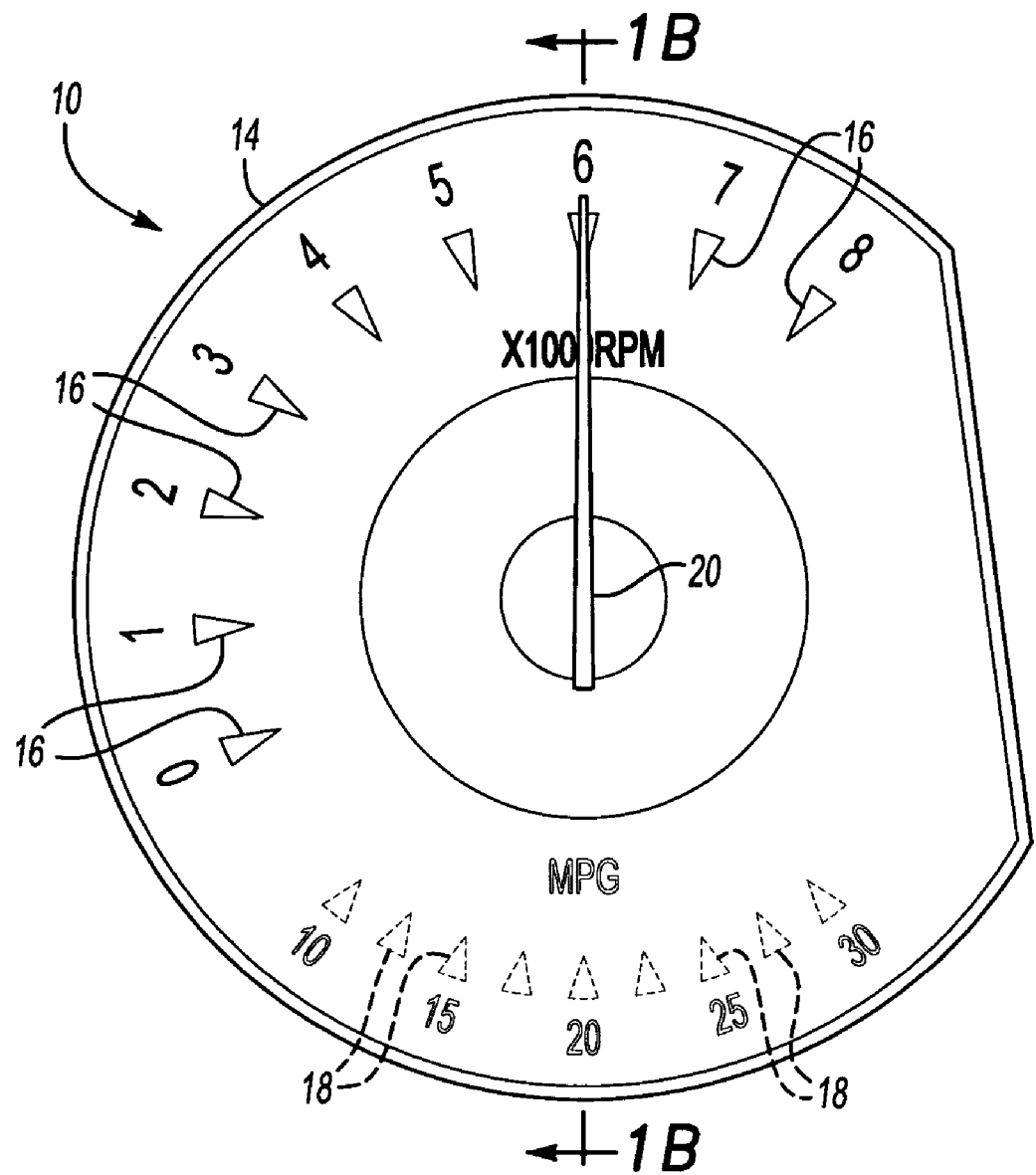
FIG. 1A is a front view of dial incorporating an example of the subject invention.

FIG. 1A shows an illuminated gauge 10 for an instrument cluster 12 (FIGS. 4A-4B) that is mounted within a vehicle dashboard (not shown). The illuminated gauge 10 includes a single dial 14 that includes a first range of markings 16 to identify a first type of vehicle information and a second range of markings 18 to identify a second type of vehicle information that is different from the first type. A common pointer 20 is selectively controlled to operate in either the first range of markings 16 or the second range of markings 18. In the example of FIG. 1A, the first range of markings 16 comprise markings that indicate a range of engine revolutions per minute (RPM), and the second range of markings 18 comprise markings that indicate fuel economy information, such as miles-per-gallon (MPG).

Figure 1B:
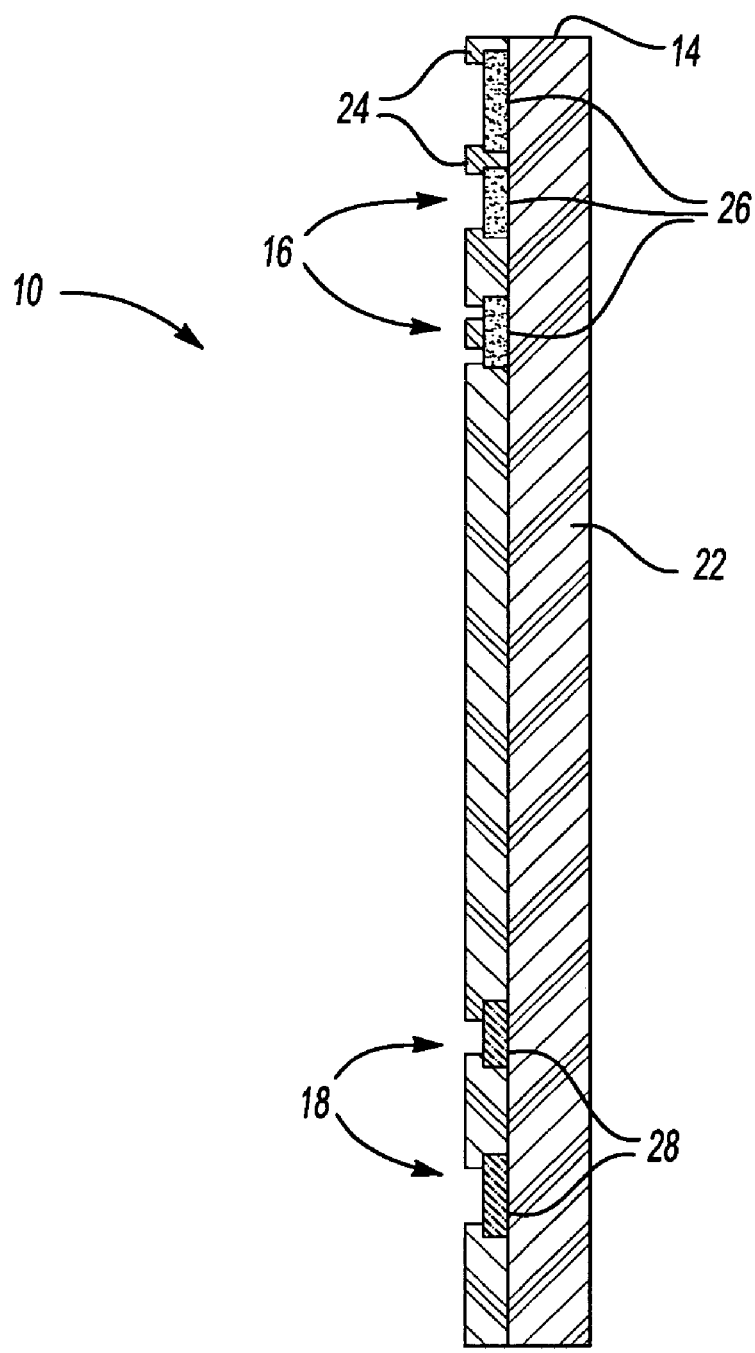
FIG. 1B is a cross-sectional view of FIG. 1A.

As shown in FIG. 1B, the dial 14 includes a body portion 22 made from polycarbonate (PC) material or polymethyl methacrylate (PMMA) material, for example. The first 16 and second 18 ranges of markings are printed or painted on an outer surface of the body portion 22. In the example shown, the first range of markings 16 is applied via black 24 and white 26 printing, and the second range of markings 18 is applied via smoke printing 28. Markings formed by smoke printing are hidden (FIG. 1A) under predetermined conditions, and become visible when selected. Smoke printing is a known process, and any type of smoke printing could be used to form the second range of markings 18.

Figure 2:
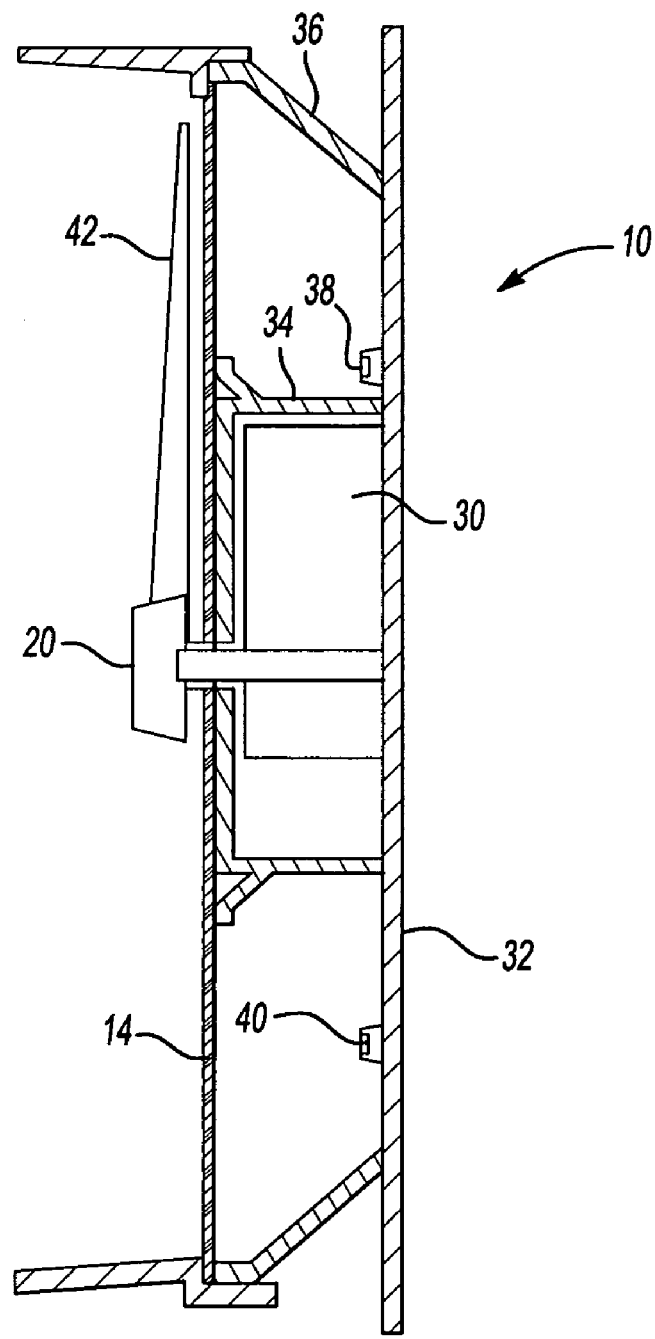
FIG. 2 is a cross-sectional view of an illuminated gauge incorporating the dial of FIG. 1A-1B.
Figure 3:
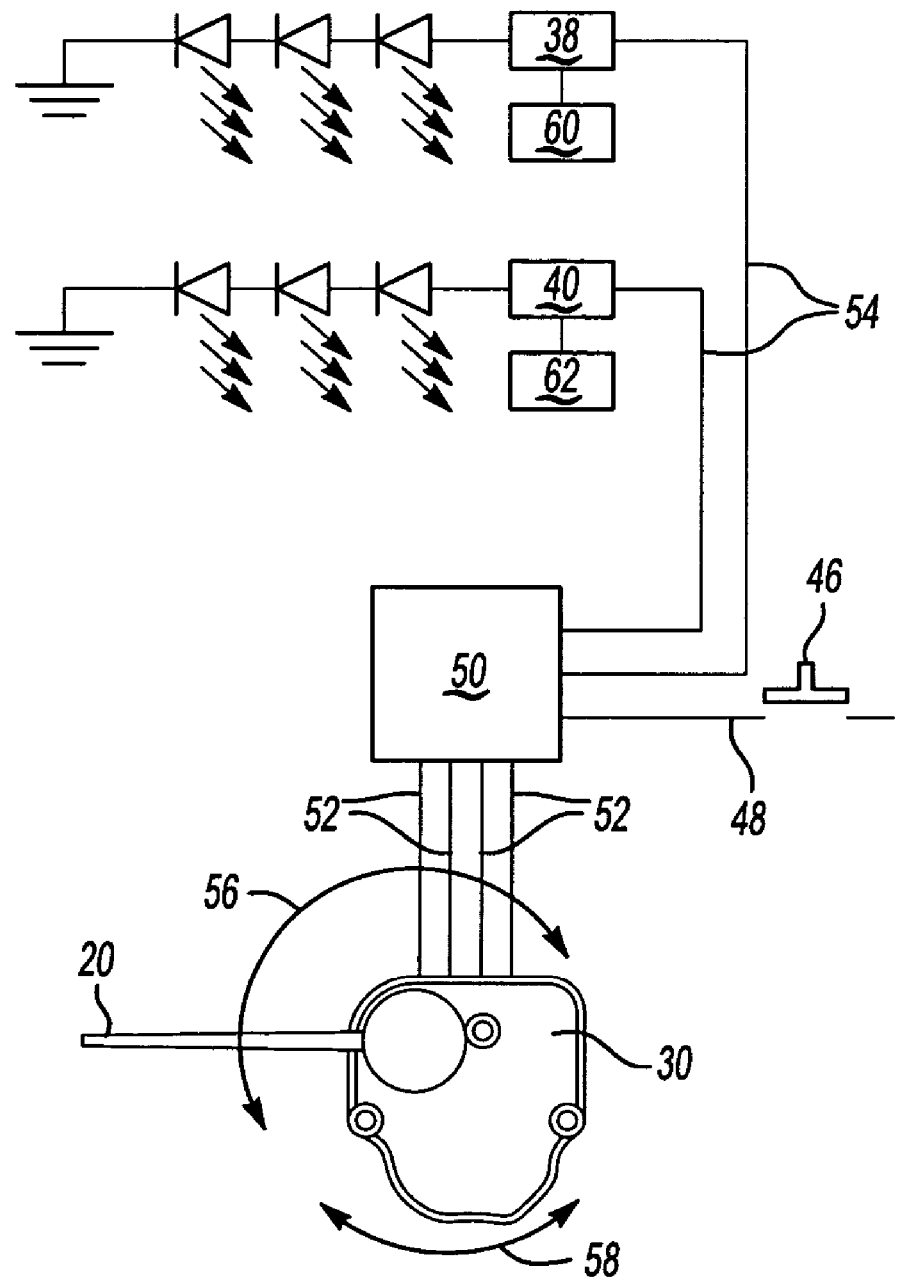
FIG. 3 is and example of a schematic control diagram for the illuminated gauge of FIG. 2.

The pointer 20 is coupled to a power source 30, such as a motor for example, as shown in FIG. 2. The power source 30 is electrically connected to a printed circuit board (PCB) 32. The power source 30 could be connected to either side of the PCB 32. A light guide 34 and a light housing 36 cooperate to direct light from first 38 and second 40 light sources to illuminate the pointer 20. The dial 14 is supported by at least one of the light guide 34 and light housing 36. In the example shown, the first light source 38 is only used to illuminate the dial 14 and pointer 20 in the area of the first range of markings 16, and the second light source 40 is only used to illuminate the dial 14 and pointer 20 in the area of the second range of markings 18.

Thus, the dial 14 comprises a single body portion 22 that is configured to include at least two different types of vehicle information. Further, the pointer 20, controlled by a single power source 30, comprises a single pointer arm 42 (FIG. 2) that is selected to operate only in one of the first 16 or second 18 ranges of markings. Using a single pointer 20 and single power source 30 to indicate multiple types of vehicle information provides for a very compact and cost effective design.

Figure 4A:
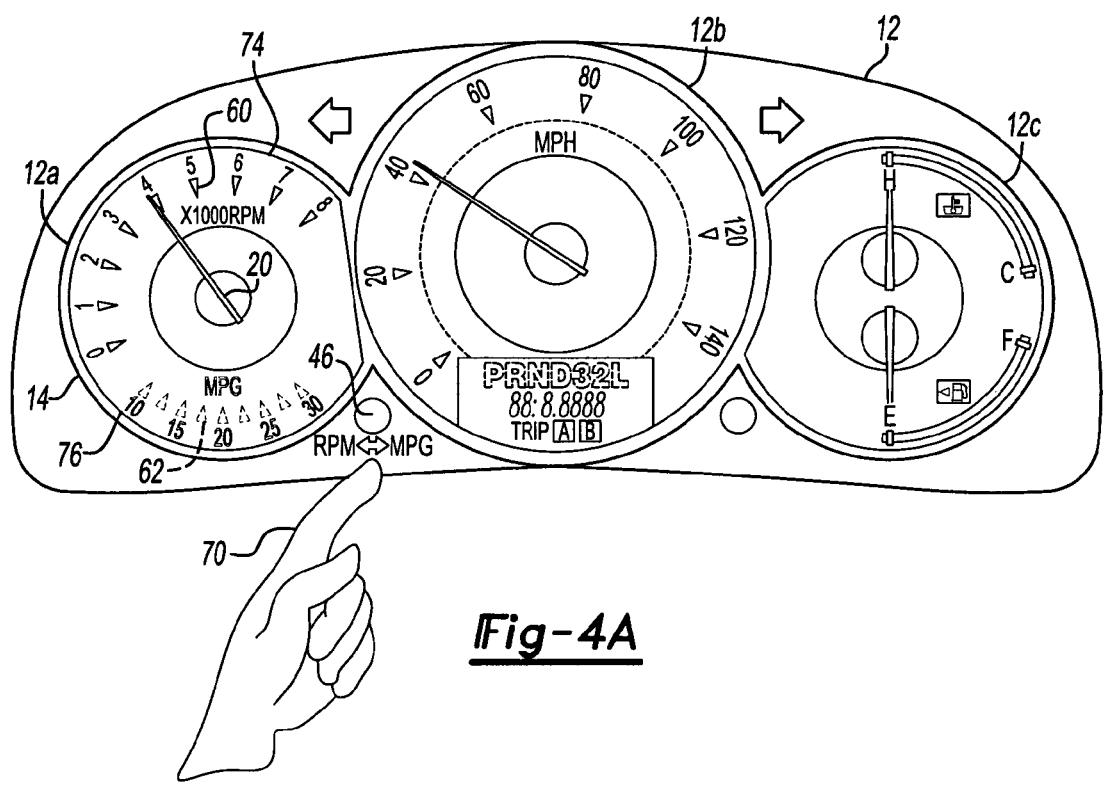
FIG. 4A is one example of an instrument cluster with one example embodiment of an illuminated gauge incorporating the subjection invention, with the illuminated gauge being in a first operating condition.

A selector 46, such as a button or switch for example, is configured to be actuated by a user as shown in FIG. 4A. The selector 46 sends a signal 48 to a CPU or microprocessor 50, which then sends a power control signal 52 to the power source 30. The microprocessor 50 also sends a light control signal 54 to activate at least one of the first 38 or and/or second 40 light sources. The power source 30 responds to the power control signal 52 to operate the pointer 20 within a first range of motion 56 for the first range of markings 16 or a second range of motion 58 for the second range of markings 18. The first light source 38 cooperates with the pointer 20 to illuminate a first type of vehicle information 60, and the second light source 40 cooperates with the pointer 20 to illuminate a second type of vehicle information 62.

The selector 46 can be positioned at any easily accessible location within a passenger compartment, such as on dashboard or steering wheel for example. The microprocessor 50 can be separate from, or part of, the PCB 32.

In one example, the first light source 38 only illuminates the first type of vehicle information 60 when selected, and the second light source 40 only illuminates the second type of vehicle information 62 when selected. Optionally, one of the first 38 and second 40 light sources could comprise a primary light source that is always on, while the other of the first 38 and second 40 light sources comprises a secondary light source that is only activated when selected.

The first 60 and second 62 types of vehicle information can be any type of vehicle information such as vehicle speed, fuel consumption, battery voltage, oil pressure, engine revolutions-per-minute, and temperature for example. Other types of vehicle information could also be incorporated onto the dial 14. Examples of different dial configurations are shown in FIGS. 4A-7B.

Figure 4B:
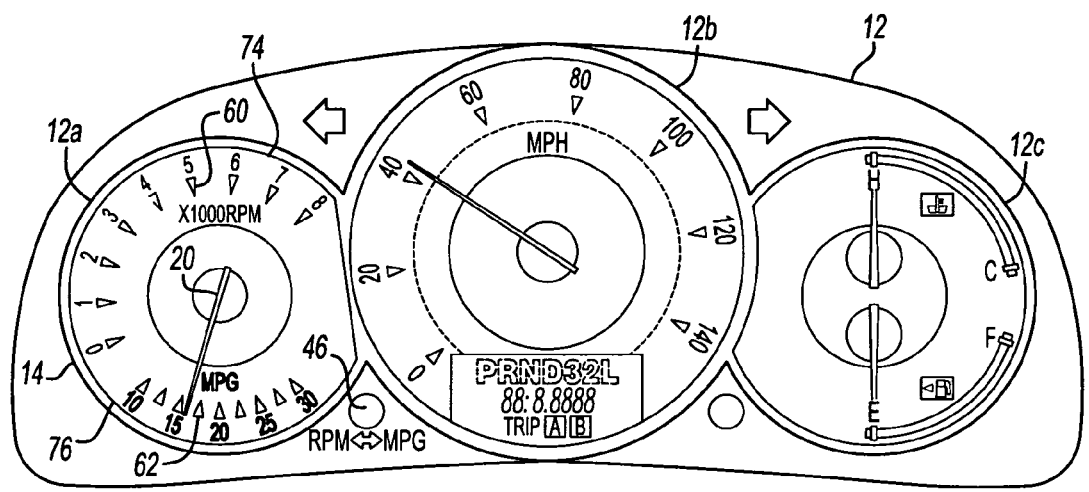
FIG. 4B is similar to FIG. 4A but shows the illuminated gauge in a second operating condition.

FIGS. 4A and 4B show an example of an instrument cluster 12 with three (3) different illuminated gauges 12a, 12b, and 12c. Gauge 12b indicates vehicle speed and gauge 12c indicates temperature. Gauge 12a is a dual-type gauge, discussed above, that includes a first type of vehicle information 60 (in this example RPMs) and a second type of vehicle information 62 (in this example fuel consumption MPG).

In FIG. 4A, only the first type of vehicle information 60 is illuminated with pointer 20 indicating the appropriate information. A user 70 activates the selector 46 to switch to show the second type of information 62 (FIG. 4B), which is now shown in solid lines. The pointer 20 is now operating to indicate the appropriate information within the second type of information. In this example, the first type of information 60 is formed at a first outer peripheral location 74 of the dial 14 and the second type of information 62 is formed at a second outer peripheral location 76 of the dial 14. Both the first 74 and second 76 outer peripheral locations are generally located within a common radial distance from a pivot axis defined by the pointer 20.

Figure 5A:
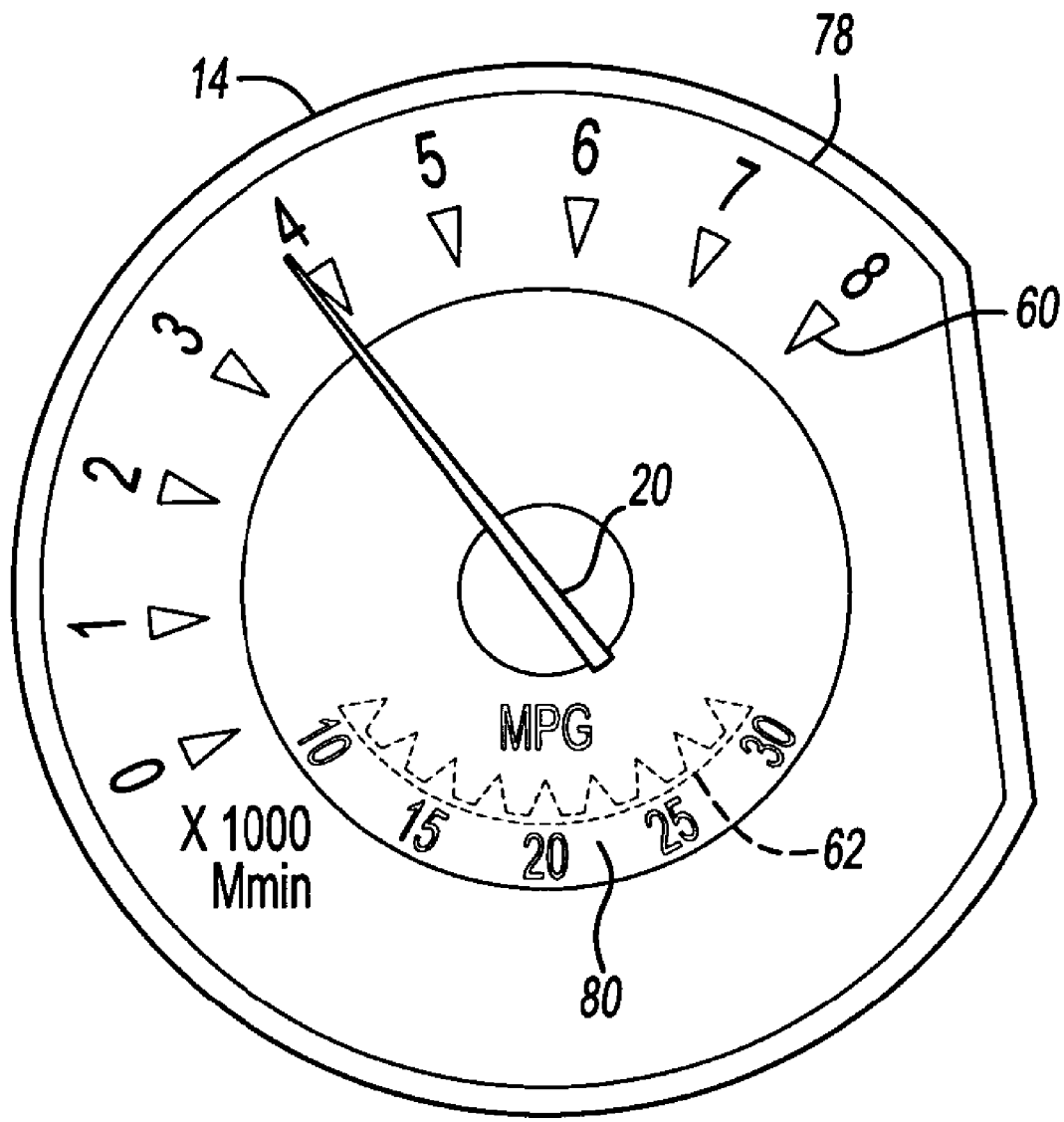
FIG. 5A is another example of an illuminated gauge in a first operating condition.
Figure 5B:
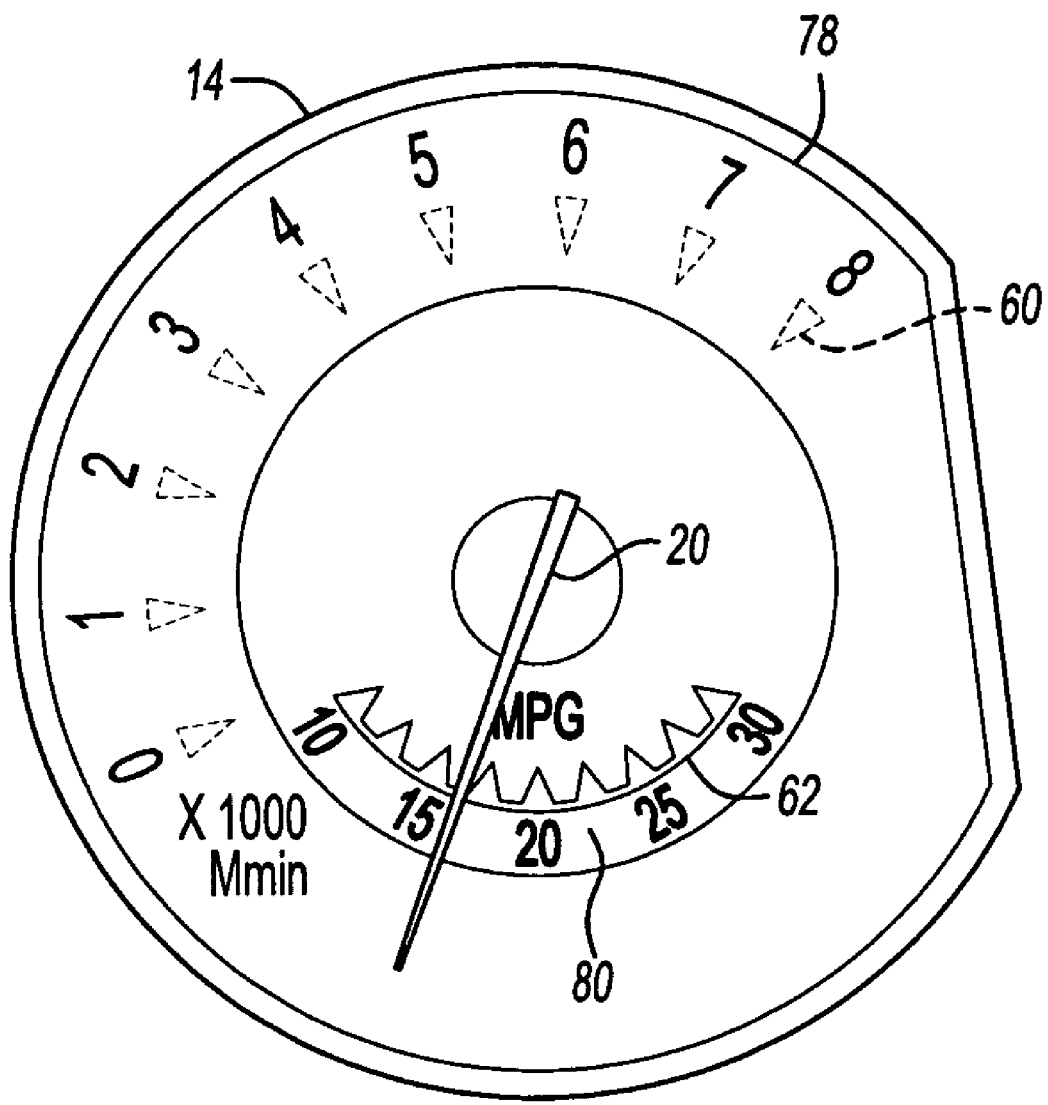
FIG. 5B is the illuminated gauge of FIG. 5A in a second operating condition.

FIGS. 5A and 5B also show a gauge with RPM and MPG information; however the second type of information 62 is positioned at a different location on the dial 14. The first type of information 62 is located at an outer peripheral position 78 with the second type of information 80 being located at an inner peripheral position 80 that is radially closer to the pivot axis of the pointer 20.

Figure 6A:
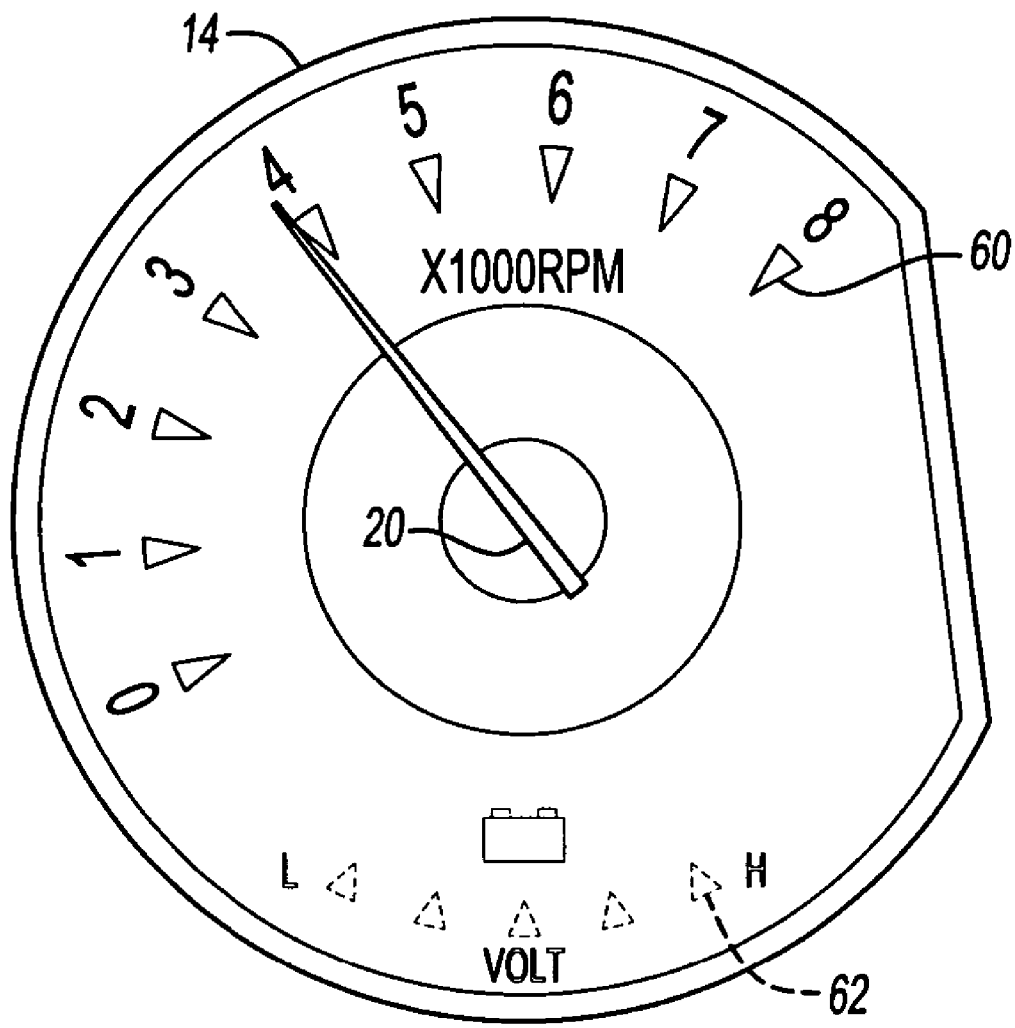
FIG. 6A is another example of an illuminated gauge in a first operating condition.
Figure 6B:
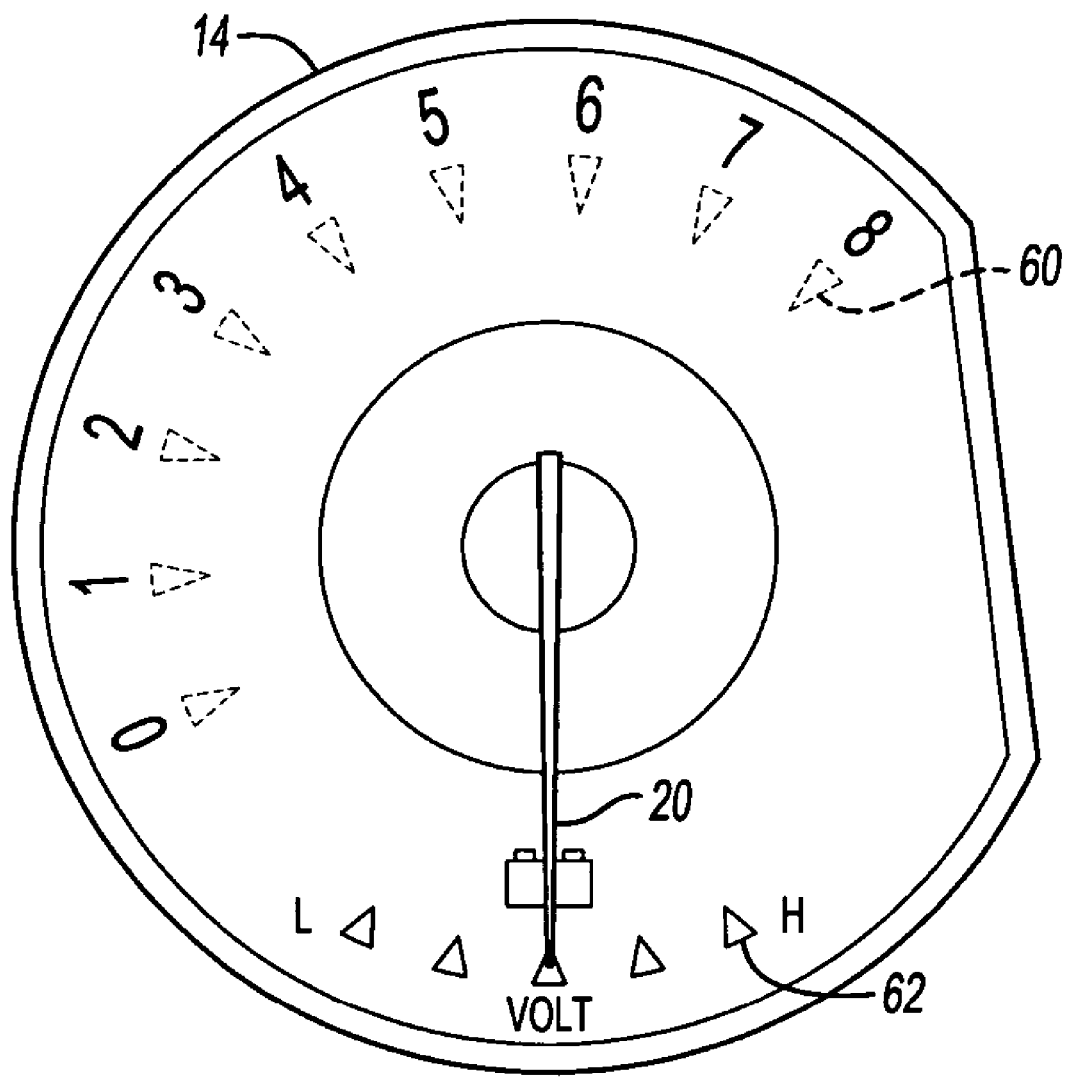
FIG. 6B is the illuminated gauge of FIG. 6A in a second operating condition.
Figure 7A:
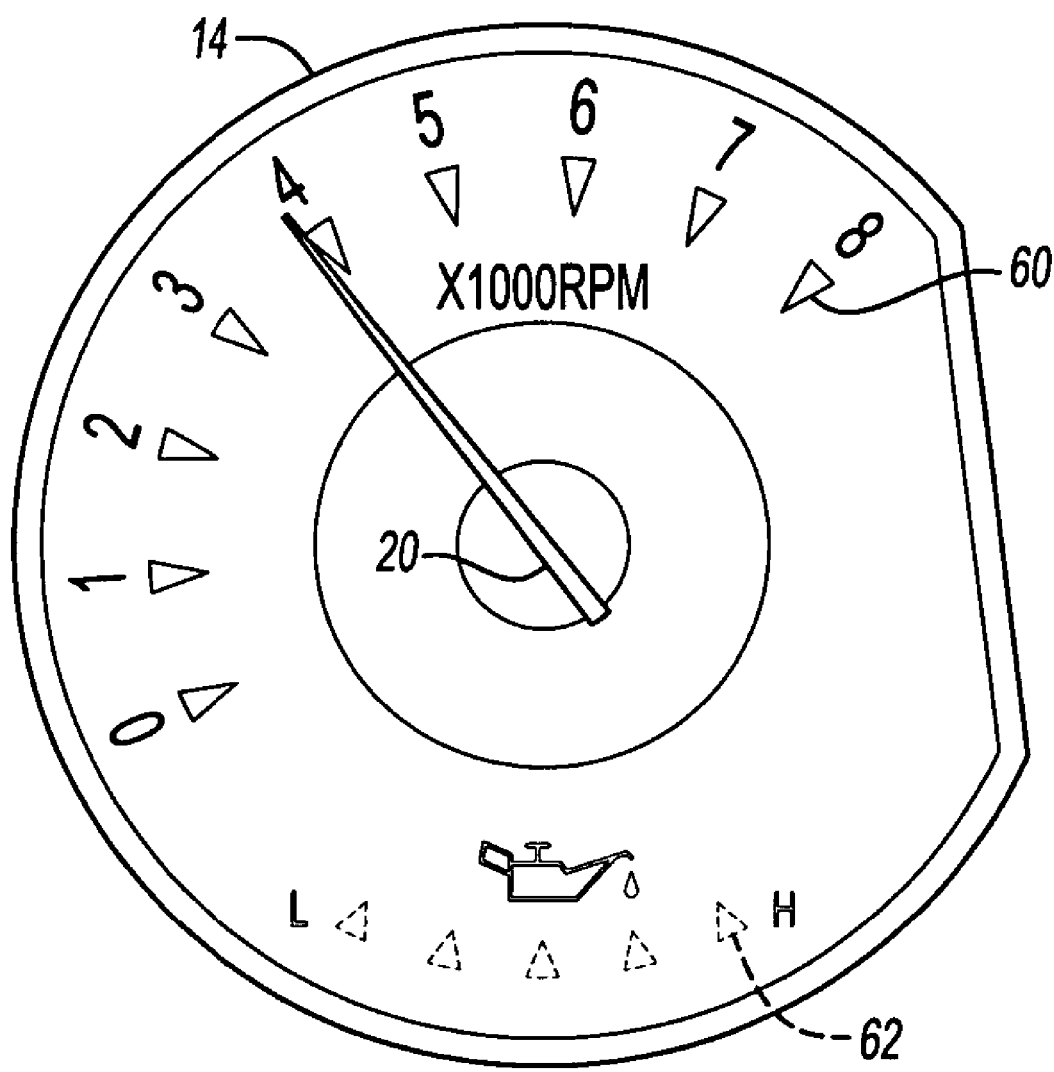
FIG. 7A is another example of an illuminated gauge in a first operating condition.
Figure 7B:
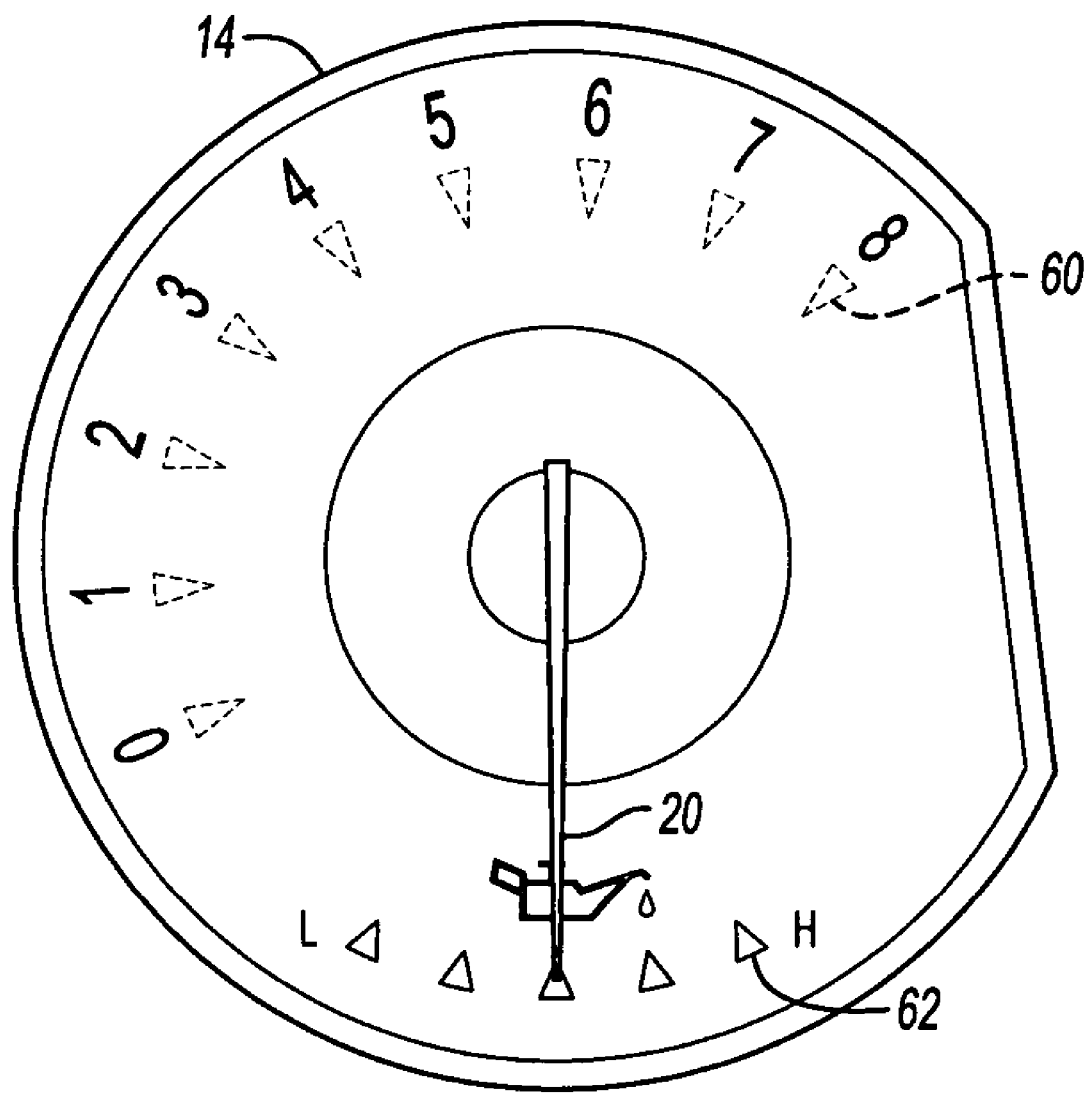
FIG. 7B is the illuminated gauge of FIG. 7A in a second operating condition.

FIGS. 6A and 6B show an example where the first type of vehicle information 60 is RPMs and the second type of vehicle information 62 is battery voltage. FIGS. 7A and 7B show an example where the first type of vehicle information 60 is RPMs and the second type of vehicle information 62 is oil pressure.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An illuminated gauge for an instrument cluster comprising:
    a dial including a first range of markings to identify a first type of vehicle information and a second range of markings to identify a second type of vehicle information, and wherein said first range of markings is formed from a first printing type and said second range of markings is formed from a second printing type different from said first printing type;
    a pointer to be driven by a power source for movement relative to said dial, said pointer being selectively movable to operate within only one of said first range of markings and said second range of markings, wherein said power source comprises a motor that is electrically connected to a printed circuit board and wherein said pointer is coupled to said motor;
    at least one light source to illuminate said pointers;
    a light guide supported by said printed circuit board and surrounding said motor;
    a light housing supported by said printed circuit board and surrounding said light guide at a location radially outward relative to said light guide, wherein said light housing and said light guide cooperate to direct light to illuminate said pointer; and
    wherein said at least one light source comprises a first light source supported on said printed circuit board at first position located radially between said light guide and said light housing such that said first light source is only used to illuminate said dial and said pointer in an area of said first range of markings, and a second light source supported on said printed circuit board at second position located radially between said light guide and said light housing such that said second light source is only used to illuminate said dial and said pointer in an area of said second range of markings.

2. The illuminated gauge according to claim 1 including a selector to be actuated by a user to select one of said first type of vehicle information and said second type of vehicle information.

3. The illuminated gauge according to claim 2 wherein at least one of said first range of markings and said second range of markings is illuminated only when selected by said selector.

4. The illuminated gauge according to claim 1 wherein said first type of vehicle information comprises one of vehicle speed, fuel consumption, battery voltage, oil pressure, engine revolutions-per-minute, and temperature; and wherein said second type of vehicle information comprises another one of vehicle speed, fuel consumption, battery voltage, oil pressure, engine revolutions-per-minute, and temperature.

5. The illuminated gauge according to claim 1 wherein said motor provides movement for said pointer within both of said first and said second ranges of markings.

6. The illuminated gauge according to claim 1 wherein said pointer comprises a single arm that is to be coupled to the power source.

7. An illuminated gauge for an instrument cluster comprising:
- a dial including a first range of markings to identify a first type of vehicle information and a second range of markings to identify a second type of vehicle information, and wherein said first range of markings is formed from a first printing type and said second range of markings is formed from a second printing type different from said first printing type;
- a pointer being selectively movable to operate within only one of said first range of markings and said second range of markings at a time;
- a power source that drives said pointer, wherein said power source comprises a motor that is electrically connected to a printed circuit board, and wherein said pointer is directly coupled to said motor;
- a light guide supported by said printed circuit board and surrounding said motor;
- a light housing supported by said printed circuit board and surrounding said light guide at a location radially outward relative to said light guide, wherein said light housing and said light guide cooperate to direct light to illuminate said pointer;
- a first light source that illuminates said pointer when operating in said first range of markings wherein said first light source is supported on said printed, circuit, board at first position located radially between said light guide and said light housing such that said first light source is only used to illuminate said dial and said pointer in an area of said first range of markings;
- a second light source that illuminates said pointer when operating in said second range of markings wherein said second light source is supported on said printed circuit board at second position located radially between said light guide and said light housing such that said second light source is only used to illuminate said dial and said pointer in an area of said second range of markings; and
- a selector to be operated by a user to select one of said first type of vehicle information and said second type of vehicle information.

8. The illuminated gauge according to claim 7 wherein one of said first and said second printing types comprises smoke printing where smoke printed information is hidden from view under predetermined conditions and is illuminated only when selected by said selector.

9. The illuminated gauge according to claim 8 wherein said selector generates a signal that is communicated to said power source to move said pointer from operating between said first and said second range of markings.

10. The illuminated gauge according to claim 9 wherein said motor moves said pointer within a first range of movement when said first type of vehicle information is selected, and moves said pointer within a second range of movement, different than said first range of movement, when said second type of vehicle information is selected.

11. The illuminated gauge according to claim 7 wherein said selector comprises one of a button and a switch.

12. The illuminated gauge according to claim 7 wherein said dial comprises a single dial body including both said first and said second ranges of markings and wherein said pointer comprises a single arm that is coupled to said power source.

13. The illuminated gauge according to claim 1 wherein one of said first and said second printing types comprises smoke printing where smoke printed information is hidden from view under predetermined conditions and only becomes visible when selected by a selector that selects one of said first type of vehicle information and said second type of vehicle information.

14. The illuminated gauge according to claim 13 wherein another of said first printing type and said second printing type comprises black and white printing.

15. The illuminated gauge according to claim 8 wherein the other of said first and said second printing types comprises black and white printing.

* * * * *

UNITED STATES PATENT AND TRADEMARK OFFICE
CERTIFICATE OF CORRECTION

| | |
|---|---|
| PATENT NO. | : 7,612,683 B2 |
| APPLICATION NO. | : 11/583530 |
| DATED | : November 3, 2009 |
| INVENTOR(S) | : Kenichi Takato |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 291 days.

Signed and Sealed this

Nineteenth Day of October, 2010

David J. Kappos
*Director of the United States Patent and Trademark Office*